(12) United States Patent
Carton et al.

(10) Patent No.: US 12,465,317 B2
(45) Date of Patent: Nov. 11, 2025

(54) NON-UNIFORM THICKNESS BREAST IMAGING PHANTOM FOR 2D/3D SPECTRAL IMAGING

(71) Applicant: GE Precision Healthcare LLC, Wauwatosa, WI (US)

(72) Inventors: Ann-Katherine Carton, Clamart (FR); Remy Klausz, Neuilly sur Seine (FR); Pablo Milioni de Carvalho, Chaville (FR); Ruben Sanchez de la Rosa, Antony (FR); Serge Muller, Guyancourt (FR)

(73) Assignee: GE Precision Healthcare LLC, Wauwatosa, WI (US)

( * ) Notice: Subject to any disclaimer, the term of this patent is extended or adjusted under 35 U.S.C. 154(b) by 196 days.

(21) Appl. No.: 18/370,065

(22) Filed: Sep. 19, 2023

(65) Prior Publication Data

US 2025/0090128 A1   Mar. 20, 2025

(51) Int. Cl.
*A61B 6/04* (2006.01)
*A61B 6/50* (2024.01)
*A61B 6/58* (2024.01)

(52) U.S. Cl.
CPC .............. *A61B 6/583* (2013.01); *A61B 6/502* (2013.01); *A61B 6/0414* (2013.01)

(58) Field of Classification Search
CPC ........... A61B 6/58; A61B 6/582; A61B 6/583; A61B 6/585; A61B 6/4035
See application file for complete search history.

(56) References Cited

U.S. PATENT DOCUMENTS

| | | | |
|---|---|---|---|
| 2003/0072417 A1* | 4/2003 | Kaufhold | A61B 6/482 378/207 |
| 2008/0167552 A1 | 7/2008 | Bouchevreau | |
| 2014/0086386 A1 | 3/2014 | Han | |
| 2017/0347987 A1 | 12/2017 | Hong | |
| 2020/0060632 A1 | 2/2020 | Blaski et al. | |
| 2020/0155104 A1 | 5/2020 | Kuwabara | |

FOREIGN PATENT DOCUMENTS

JP         2008161690 A  *  7/2008  ............. A61B 6/481

OTHER PUBLICATIONS

Sun Nuclear, Breast Biopsy Phantoms, https://www.sunnuclear.com/products/breast-biopsy-phantoms.
EP application 24198352.7 filed Sep. 4, 2024—extended Search Report issued Jan. 27, 2025; 9 pages.

(Continued)

*Primary Examiner* — Don K Wong
(74) *Attorney, Agent, or Firm* — Boyle Fredrickson S.C.

(57) ABSTRACT

A breast phantom is provided that has a non-uniform thickness to mimic clinically realistic variations in compressed breast thicknesses when in contact with the compression paddle during a mammography imaging procedure. With the non-uniform thickness, the breast phantom enables a mammography imaging device to be tested for image quality with regard to image correction processes and/or algorithms employed by the mammography imaging device to address non-uniformity in the thickness of the imaged breast. The breast phantom can be made of one or more sections, with one or more of the sections having a non-uniform thickness.

20 Claims, 6 Drawing Sheets

(56) References Cited

OTHER PUBLICATIONS

Lau Kristen C et al.: "Acquisition parameters for a dual-energy contrast-enhanced digital mammography using a micelle-based all-in-one nanoparticle (AION) contrast agent: a Phantom Study". Progress in Biomedical Optics and Imaging SPIE—International Society for Optical Engineering; Bellingham; WA, US, vol. 10718, pp. 107180N-10718N, XP060106634.

* cited by examiner

FIG. 9

NON-UNIFORM THICKNESS BREAST IMAGING PHANTOM FOR 2D/3D SPECTRAL IMAGING

FIELD OF THE DISCLOSURE

The present disclosure relates generally to phantoms for medical imaging systems, including mammography systems and devices, and more specifically to breast phantom structures for mammography systems.

BACKGROUND OF THE DISCLOSURE

Embodiments of the invention relate generally to X-ray medical imaging, and more particularly to devices, systems and methods employed to perform various imaging procedures, such as mammography imaging procedures including but not limited to spectral mammography (SM), such as 2D/3D dual-energy contrast-enhanced (CE) mammography exams, full-field digital mammography (FFDM) or digital breast tomosynthesis (DBT) mammography exams.

Spectral mammography (SM) is an X-ray imaging modality used to scan breasts for screening, diagnosis and/or interventional examinations. The effectiveness of spectral mammography is affected by numerous factors, one of which is the two-dimensional (2D) rendering of images obtained using SM.

Alternative systems to SM are also known for breast imaging. Some examples include full-field digital mammography, which captures the image directly onto a flat-panel detector, computed radiography, which involves the use of a cassette that contains an imaging plate, or digital breast tomosynthesis (DBT). A digital breast tomosynthesis (DBT) or mammography-tomography (mammo-tomo) system is a dedicated mammography system that acquires several (e.g., tens of) angularly offset projection X-ray images and uses the resulting X-ray image data to reconstruct three-dimensional (3D) image datasets.

The 3D image datasets are used to form various volumetric representations of the imaged breast, including an entire 3D volume of the breast, and various 3D sections of the 3D volume, such as slices or slabs constituting specified thicknesses of the 3D volume oriented to provide the desired view of one or more regions of interest (ROI) detected within the 3D image dataset.

In addition, when the 3D image datasets of the breast have been produced, after being utilized in a suitable diagnosis procedure, they can be utilized to guide a biopsy device employed with the DBT system into the breast to obtain a biopsy of the region of interest (ROI) identified within the 3D image datasets. In DBT systems, the biopsy device is disposed directly on the DBT system in order to be able to perform the biopsy utilizing the 3D image dataset to guide the biopsy device to the ROI.

With regard to the use of these DBT mammography systems, the set-up of the system to obtain the images requires the attachment of various devices to the system in order to provide the system with the proper positioning, i.e., compression, of the breast to obtain the image quality desired. In mammography systems, the devices that are attached to the system to perform the imaging and/or biopsy procedure include a compression paddle, a bucky, or detector holder and breast support surface, and a biopsy holder, which is utilized to locate the biopsy device on the mammography system in a location where the biopsy device can perform the desired biopsy procedure under the guidance of the mammography system.

For diagnostic mammography imaging devices, such as that disclosed in US Patent Application Publication No. US20200060632, entitled Apparatus And Method For Mammographic Breast Compression, the entirety of which is expressly incorporated herein by reference for all purposes, it is necessary to evaluate the ability of the mammography imaging device to provide images of sufficient quality of a breast for diagnostic purposes. To perform these evaluations, breast phantoms are employed. The breast phantoms are formed from materials that mimic the physical structure of the breast, such as the compressibility of the breast as well as the different types of tissues that can be present within the breast and are to be detected by the mammography imaging device or system. As the breast phantom has a known structure with known positions of the materials mimicking the tissue types to be detected by the mammography imaging device, when positioned on the mammography imaging device, the breast phantom can be used to test the ability of the mammography imaging device to provide accurate and detailed images of the breast phantom structure in comparison with the known structure of the breast phantom.

While the structure of prior art breast phantoms are suitable for generally representing the overall structure and type of tissues present in a breast, these prior art breast phantoms suffer from a number for deficiencies when utilized for evaluation of mammography imaging devices. For example, as the phantom is formed as a structure approximating the breast without any connection to an adjacent anatomical structure, such as a chest wall, the compression of the breast phantom is close to uniform across the entirety of the phantom. However, due to the connection of an actual breast to the chest wall, the chest wall normally creates non-uniformity in the compressed thickness of the breast between a compression paddle and a compression or support surface on the detector for a mammography imaging procedure. This non-uniform thickness can be present in one or both of the anterior/posterior direction and the lateral direction. Because the non-uniform compression thickness occurs regularly in mammography imaging procedures, the federal regulations covering the quality standards for compression paddles in mammography imaging procedures in 21 CFR § 900.12(b)(8)(ii)(C) require that "the compression paddle shall be flat and parallel to the breast support table and shall not deflect from parallel by more than 1.0 cm at any point on the surface of the compression paddle when compression is applied." Therefore, during the evaluation or testing of a mammography imaging device, it is necessary to accommodate for the imaging of a breast having compression thickness that results in a deflection of the compression paddle of up to 1.0 cm from parallel to the breast support table/detector surface. Thus, prior art breast phantoms that do not provide non-uniform compression thicknesses that deflect the compression paddle up to 1.0 cm from parallel do not effectively evaluate the mammography imaging device through the entire range of operational conditions for the imaging device.

Further, in order to effective evaluate the performance of the mammography imaging device in providing an accurate image of the breast phantom, it is necessary to show reproducibility of the images obtained of the phantom by the mammography imaging device. However, the compressibility of the prior art breast phantoms does not allow for repeatable compression of the breast, such that in each test set up the phantom is compressed in at least a slightly different manner, and the resulting images of the phantom are not reproduceable between different set ups.

Therefore, with regard to the aforementioned shortcomings of prior art breast phantoms utilized in the evaluation of a mammography imaging device or system, it is desirable to develop a breast phantom that more realistically approximates the non-uniform compression a breast in an easily reproduceable manner.

SUMMARY OF THE DISCLOSURE

According to one aspect of an exemplary embodiment of the present disclosure, a breast phantom is provided that has a non-uniform thickness to mimic clinically realistic variations in compressed breast thicknesses when in contact with the compression paddle during a mammography imaging procedure. With the non-uniform thickness, the breast phantom enables a mammography imaging device to be tested for image quality with regard to image correction processes and/or algorithms employed by the mammography imaging device to address non-uniformity in the thickness of the imaged breast.

In another aspect of an exemplary embodiment of the present disclosure, the breast phantom can be made of one or more sections, with one or more of the sections having a non-uniform thickness. In this manner, when combined with multiple sections of different materials, backgrounds, and/or non-uniform thickness, the breast phantom can be formed to have various combinations of backgrounds, total thicknesses and various non-uniform thickness orientations, among other properties.

According to another aspect of an exemplary embodiment of the present disclosure, a mammography phantom includes a non-uniform thickness body formed of a breast-equivalent material, the body including a sloped upper surface and a number of test plugs disposed within the body.

According to still another aspect of an exemplary embodiment of the present disclosure, a top section for a breast phantom includes a non-uniform thickness body having a sloped upper surface.

According to still another aspect of an exemplary embodiment of the present disclosure, a method for evaluating the performance of a mammography imaging device including an image correction algorithm includes the steps of providing a mammography imaging device having a gantry including a radiation source, a detector alignable with the radiation source and defining a compression surface, and a compression paddle moveably disposed on the gantry between the radiation source and the detector, and a controller operably connected to the gantry to control the operation of the compression paddle, radiation source and detector to generate image data, the controller including a central processing unit and interconnected electronic memory unit for processing the image data from the detector to form images employing an image correction algorithm, providing a mammography phantom having a non-uniform thickness body formed of a breast-equivalent material, the body including a sloped upper surface, and a number of test plugs disposed within the body, and engaging the phantom between the compression paddle and the compression surface, and obtaining image data of the phantom for evaluation of the performance of the mammography imaging device and image correction algorithm.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

Further, while the embodiments disclosed herein are described with respect to a mammography apparatus for the 2-dimensional imaging of breast tissue, it is to be understood that embodiments of the invention may be applicable to other types of imaging devices for both 2-dimensional and 3-dimensional imaging including, for example, fluoroscopy, full-filed digital mammography, digital breast tomosynthesis (DBT) and spectral mammography (single or multi-energy), as well as for imaging procedures for tissue other than breast tissue. Further still, embodiments of the invention may be used to analyze tissue, generally, and are not limited to analyzing human tissue.

Figure 1:
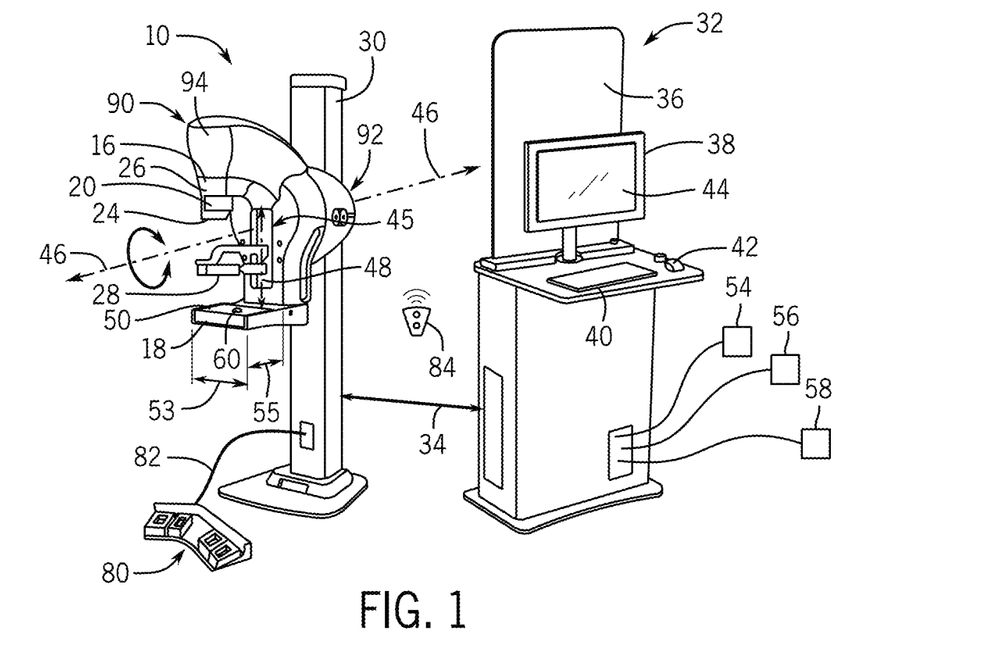
FIG. 1 is a perspective view of a radiography imaging device in the form of a mammography imaging device for imaging the breast tissue of a patient, in accordance with an embodiment of the disclosure.
Figure 2:
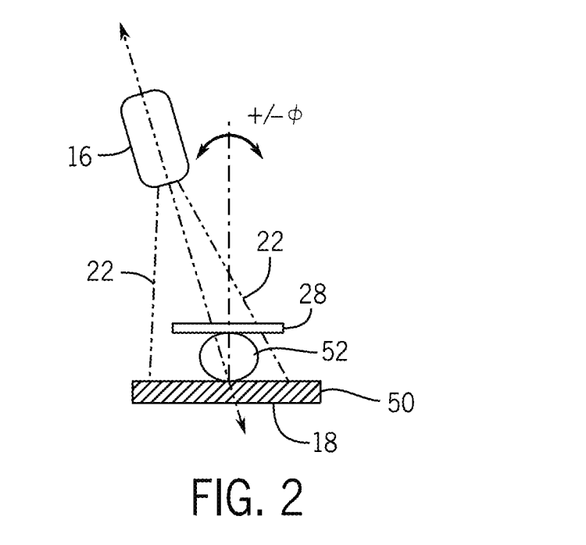
FIG. 2 is a diagram of the mammography imaging device of FIG. 1, showing the radiation source of the system in a scanning position, in accordance with the disclosure.

Referring now to FIGS. 1 and 2, the major components of an exemplary radiography imaging device 10 formed as a mammography imaging device 12 for imaging breast tissue according to an embodiment of the invention are shown. The imaging device 10, such that disclosed in US Patent Application Publication No. US20200060632, entitled Apparatus And Method For Mammographic Breast Compression, the entirety of which is expressly incorporated herein by reference for all purposes, includes a radiation source/x-ray source 16, a radiation detector 18, and a collimator 20. The radiation source 16 is movable between a variety of imaging positions relative to the detector 18, and is operative to emit radiation rays 22 (FIG. 2) that are received by the radiation detector 18 to provide an image of an object, such as a breast 52. In embodiments, the mammography imaging device 12 may include a patient shield 24 mounted to the radiation source 16 via face shield rails 26 to prevent the patient's head from obstructing the radiation rays and protecting the patient from the radiation rays 22.

Referring still further to FIGS. 1 and 2, the mammography imaging device 12 also includes a compression paddle or plate 28 and a support structure 30 to which one or more of the radiation source 16, radiation detector 18, and/or compression plate 28 are mounted. In embodiments, the mammography imaging device 12 may further include a controller 32. The controller 32 may be a workstation having at least one processor/central processing unit/computer and a memory device/database that stores information and/or instructions for the operation of the mammography imaging device 12 that are employed by the controller 32, as shown in FIG. 1 or, in other embodiments, the controller 32 may be embedded/integrated into one or more of the various components of the mammography imaging device 12 disclosed above. In embodiments, the controller 32 may be in electrical communication with the radiation source 16, radiation detector 18, and/or the compression plate 28 via a cable 34. As will be appreciated, in embodiments, the connection 34 may be a wireless connection. In embodiments, the controller 32 may include a radiation shield 36 that protects an operator of the mammography imaging device 12 from the radiation rays 22 emitted by the radiation source 16. The controller 32 may further include a display 38, a keyboard 40, mouse 42, and/or other appropriate user input devices that facilitate control of the mammography imaging device 12 via a user interface 44.

As further shown in FIGS. 1 and 2, the radiation source 16, along with the radiation detector 18, forms part of an x-ray system which provides x-ray imagery for the purpose of imaging a body part of a patient, such as breast 52. As stated above, the radiation source 16 emits the radiation rays 22 such that the radiation rays 22 travel from the radiation source 16 to the radiation detector 18. While the radiation rays 22 are discussed herein as being x-rays, it is to be understood that the radiation source 16 may emit other types of electromagnetic rays which can be used to image a patient. The radiation source 16 may be mounted to the support structure 30 such that the radiation source can rotate around an axis 46 in relation to the radiation detector 18, although movement of the radiation source 16 in paths other than rotation about a fixed axis, such as during digital breast tomosynthesis (DBT), are also envisioned. In embodiments, the radiation detector 18 may be configured to rotate or translate within its housing, such as in the directions indicated by arrows 53 and 55.

In the illustrated exemplary embodiment of FIG. 2 the radiation source 16 and the detector 18 are mounted to a gantry 90 that is secured to the support structure 30. The support structure 30 houses a translation mechanism 92 that is operably connected to the gantry 90. The translation mechanism 92 is operable to move the gantry 90 vertically with respect to the support structure 30 in order to position the gantry 90 at the appropriate height to accommodate the dimensions of the patient with which the mammography imaging device 12 is being utilized. The translation mechanism 92 is also operable to rotate the gantry 90 relative to the support structure 30 about the horizontal axis 46 in order to position the gantry 90 rotationally with regard to the patient, as necessary.

The gantry 90 includes a generally C-shaped body 94 with the radiation source 16 at one end and the detector 18 at the opposite end. In this configuration, regardless of the vertical and/or rotational orientation of the gantry 90, such as to position the radiation source 16 and detector 18 relative to the patient breast 52 to obtain x-ray images at various orientations, such as for craniocaudal (CC) or mediolateral oblique (MLO) views, among others, the radiation source 16 is disposed in alignment with the detector 18. In this position, the detector 18 is capable of receiving the x-rays 22 emitted from the radiation source 16 that pass through the portion of the patient, i.e., patient breast 52, located between the radiation source 16 and the detector 18 in order to generate image data for transmission to the control system 32 of the mammography imaging device 12 to create/reconstruct a 3D image dataset for viewing by a physician, such as by using DBT, among other known methods.

Additionally, in another embodiment the radiation source 16 can be attached to the gantry 90 to rotate and/or move independently of the gantry 90 and detector 18 in order to enable the radiation source 16 to take x-ray images of the patient breast at various angles relative to the detector 18, e.g., between +/−60°. The images obtained between these angles for the radiation source 16 can be used either for creation of stereoscopic images in a biopsy procedure using the mammography imaging device 12 or for DBT when operating the mammography imaging device 12 in an imaging mode.

As stated above, the radiation detector 18 receives the radiation rays 22 emitted by the radiation source 16. In embodiments, data regarding the radiation rays 22 received by the radiation detector 18 may be electrically communicated to the controller 32 from the radiation detector 18 via cable/electronic connection 34 such that the controller 32 generates one or more images which may be shown on the display 38 and stored in the memory device.

The compression plate 28 is operative, in response to instruction from the controller 32 or in response to instructions from controller(s) on or near the mammography imaging device 12, such as remote control, 84, or switch controllers 80 connected by cable 82, to move towards and away from the radiation detector 18 as indicated by arrows/compression axis 48 such that the compression plate 28 flattens or compresses and holds a body part, e.g., breast 52, in place against the surface 50 of the radiation detector 18. In this respect, the radiation detector 18 and the housing or surface 50 thereof is referred to herein as a "compression surface or support plate" that cooperates with the compression plate 28 to compress and clamp a breast 52 of a patient therebetween.

On many occasions the compression of the breast 52 between the compression plate 28 and the compression surface 50 results in a non-uniform compression of the breast 52, in which the thickness of the breast 52 in the compressed position is not equal across the area between the compression plate 28 and the compression surface 50. This non-uniform compression is due to a number factors, including the attachment of the breast 52 to the chest wall of the patient, the variations on the composition and density of the tissue within the breast 52, and others.

As a certain amount of deflection of the compression paddle 28 is acceptable according to federal guidelines, i.e., 21 CFR § 900.12(b)(8)(ii)(C) which states that "the compression paddle shall be flat and parallel to the breast support table and shall not deflect from parallel by more than 1.0 cm at any point on the surface of the compression paddle when compression is applied", it is necessary for the mammography imaging device 12 to provide images of sufficient quality to enable accurate detection of artefacts within the beast 52 for correct diagnosis of an imaged breast 52 with a non-uniform thickness up to the limit of 1.0 cm from parallel.

Figure 3:
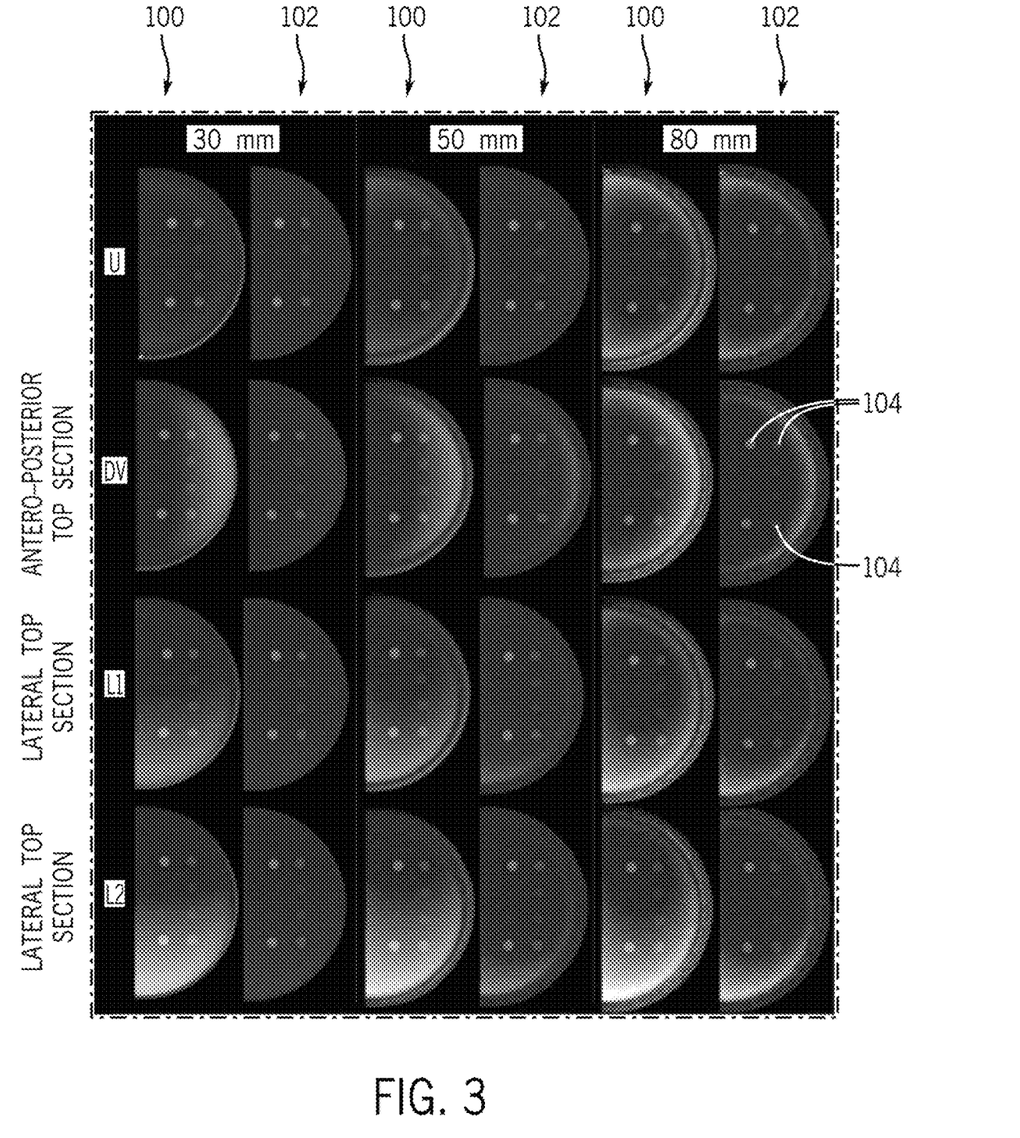
FIG. 3 are illustrations of the enhancement of images of a non-uniform thickness breasts of varying thicknesses provided by an image correction algorithm employed with the mammography imaging device of FIG. 1.

To provide this functionality to the mammography imaging device 12, a variety of image and/or scatter correction algorithms have been developed for use within and/or in conjunction with the mammography imaging device 12 that correct images obtained by the mammography imaging device 12 for non-uniformity in the thickness in the imaged breast 52. One example of a recombination algorithm of this type if the New Image Recombination Algorithm (NIRA) produced by GE Healthcare of Milwaukee, WI, which operates by adding a local estimation of breast thickness in the recombination of the images to account for the non-uniformity of the breast thickness. As shown in FIG. 3, use of the image correction algorithms, e.g., NIRA, enables the mammography imaging device 12 to enhance images 100 of a compressed breast 52 having a non-uniform thickness in an anterior-posterior (sloping from the chest wall towards the nipple) or lateral (from left to right, or vice versa) direction and produce corrected images 102 of the compressed breast 52 that enable accurate detection of artefacts 104 within the breast 52 for use in preparing a proper diagnosis.

Figure 4:
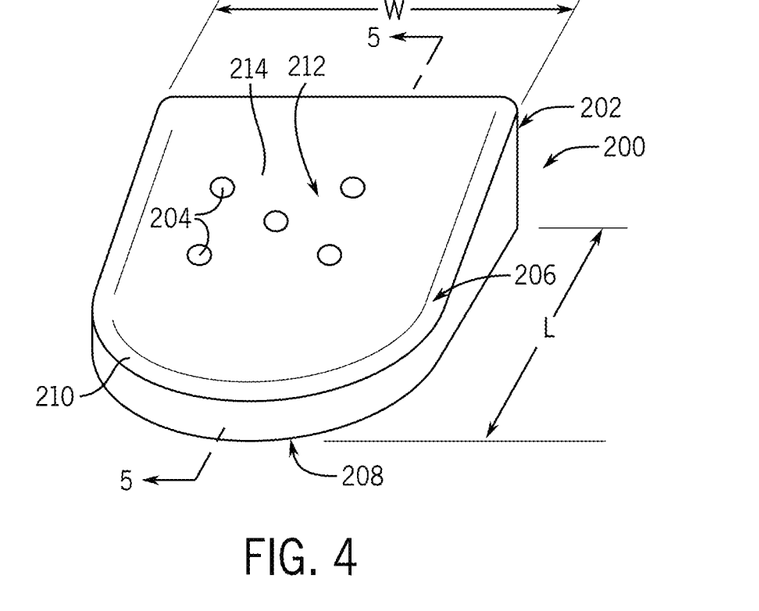
FIG. 4 is an isometric view of a first embodiment of a breast phantom in accordance with the disclosure.
Figure 5:
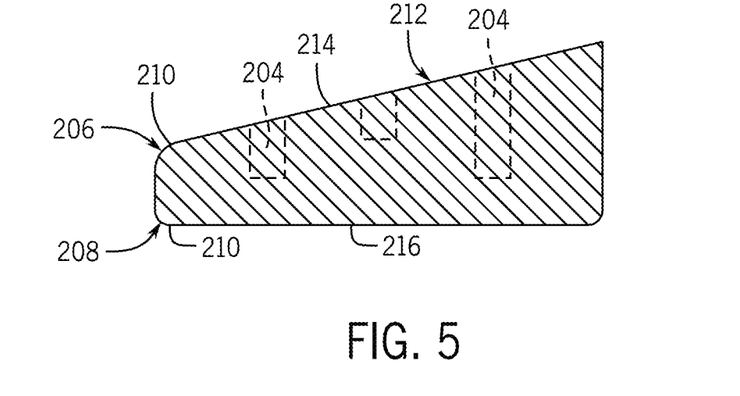
FIG. 5 is a cross-sectional view of the breast phantom of FIG. 4 in a first imaging configuration, in accordance with the disclosure.

To evaluate the ability of the mammography imaging device 12 and the image correction algorithms, e.g., NIRA, utilized therewith to accurately detect artefacts within a non-uniform thickness imaged breast and to provide images of sufficient quality, it is necessary to employ a breast phantom 200 that effectively simulates the various non-uniform thicknesses of the imaged breast 52. With reference now to FIGS. 4 and 5, a first exemplary embodiment of a breast phantom 200 having a non-uniform thickness is illustrated. In an exemplary embodiment, the phantom 200 is formed with a unitary body 202 of a suitable tissue equivalent material (TEM) and/or breast tissue equivalent material for simulating the breast 52, such as materials sold by Sun Nuclear/Computer Imaging Reference Systems, Inc. (CIRS), of Norfolk, VA such as the Digital Breast Tomosynthesis QC Phantom, the Contrast Enhanced Spectral Mammography Phantom and/or the Model 020 BR3D Breast Imaging Phantom. The body 202 is formed from a breast tissue-equivalent material in various ratios of gland and adipose tissue, such as a 50/50 ratio of gland and adipose tissue and includes a plurality of test plugs 204 disposed therein. A number of the plugs 204 are formed with different concentrations of iodine therein to mimic various levels of iodine uptake in breast tissue during a contrast enhanced mammography imaging procedure performed with the mammography imaging device 12. For example, four plugs 204 can be formed to have an iodine concentration of 0.2, 0.5, 1.0 and 2.0 mg/cm$^2$, respectively, to cover the clinical range of iodine concentrations to be identified within breasts 52 of varying densities in the images produced by the mammography imaging device 12. One or more additional plugs 204 can be formed with 100% glandular tissue equivalent material to mimic a glandular lesion for detection and/or representation in the images produced by the mammography imaging device 12. The top peripheral edge 206 and bottom peripheral edge 208 of the body 202 are each formed at least partially with rounded surfaces 210 to mimic the shaped of breast 52 compressed between the paddle 28 and the compression surface 50.

The maximum overall thickness of the breast phantom 200 can be selected to be within the range of 10 mm to 100 mm, in order to effectively mimic that various sizes and thicknesses of breasts 52 to be imaged by the mammography imaging device 12 for testing of the mammography imaging device 12 and the image correction algorithms deployed thereon across the entire practical range of breast sizes, thicknesses and/or densities, and/or shapes. In addition, other alternative breast-equivalent materials can be utilized to form the body 202, such as a suitable plastic material, including but not limited to polymethylmethacrylate (PMMA), nylon, polyethylene, and acrylonitrile butadiene styrene (ABS).

In addition, the body 202 is formed with a top surface 212 having an angle or slope 214 relative to a flat bottom surface 216 of the body 202. The differential in thickness of the phantom 200 across the body 202 resulting from the slope 214 of the top surface 212 can range up to 1.0 cm, the effective acceptable limit for deflection of the compression paddle 28 to be considered uniform compression. Further, the slope 214 of the top surface 212 can extend in an anterior-posterior direction across the top surface 212, to mimic the non-uniform thickness of a breast compressed for a cranial-caudal (CC) view of the breast 52 in the phantom 200, or in a lateral direction (either left to right, or right to left) across the top surface 212, to mimic the non-uniform thickness of a breast compressed for a mediolateral oblique (MLO) view of the breast 52 in the phantom 200, or combinations thereof. In the illustrated exemplary embodiment of FIGS. 4 and 5, the slope 214 extends across the top surface 212 and is bounded by the rounded peripheral surface 210. Thus, in the illustrated exemplary embodiment, the selected non-uniform thickness for the phantom 200 is provided by the top surface 212 between opposed sides of the phantom 200, without inclusion of the rounded surface 210. Further, the material used in the formation of the body 202 is non-compressible, e.g., rigid, such that the phantom 200 does not change shape when compressed between the compression paddle 28 and the compression surface 50 of the mammography imaging device 12 when employed in an evaluation of the mammography imaging device 12 and the image correction algorithms deployed or instantiated thereon. With this aspect of the phantom 200, the non-uniform thickness of the phantom 200 is completely repeatable across multiple test or evaluation set-ups for effective evaluation and determination of the image quality of the mammography imaging device 12.

In alternative embodiments for the phantom 200, the angle or slope 214 of the top surface 212 can be formed to provide the body 202 with a non-uniform thickness across the length L or width W of the phantom 200 of between about 0.0 cm and about 1.0 cm, such as between about 0.10 cm and 0.90 cm, or between about 0.25 cm and about 0.75 cm, including a non-uniform thickness of about 0.50 cm.

Referring no to FIGS. 6-9, in another illustrated exemplary embodiment, the phantom 300 can be formed from a plurality of independent sections including a bottom section 302, a target section 304, a textured section 306, and a top section 308 that are assembled to form the phantom 300. The bottom section 302, and textured sections 306 are formed from suitable breast-equivalent materials to simulate adipose and glandular breast tissues, such as those described previously. Further, the bottom section 302 has a rounded peripheral edge 305 to mimic the realistic shape of a compressed breast. The target section 304 is also formed of a suitable breast-equivalent material, but with test plugs 310 formed therein having varying iodine concentrations and/or glandular tissue equivalent material to simulate a lesion, as described previously. In addition, one or more of the textured sections 306 can be formed to provide enhancements to the testing capabilities of the phantom 330, such as by forming the textured section 306 of half 100% adipose material and half 100% glandular material to test iodine separation from the background over a wide range of densities.

Figure 6:
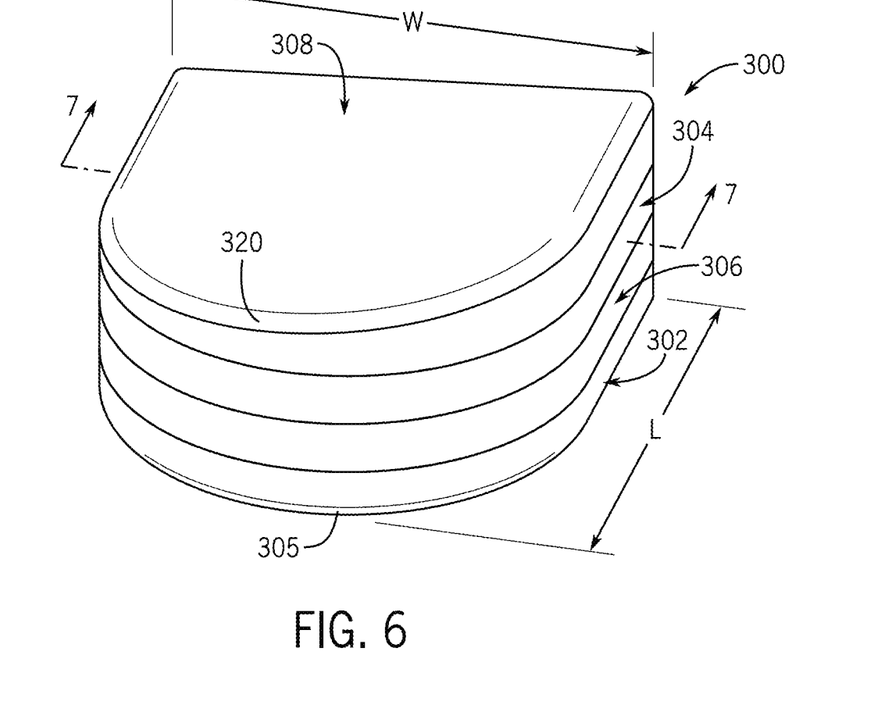
FIG. 6 is an isometric view of a second embodiment of the breast phantom, in accordance with the disclosure.
Figure 7:
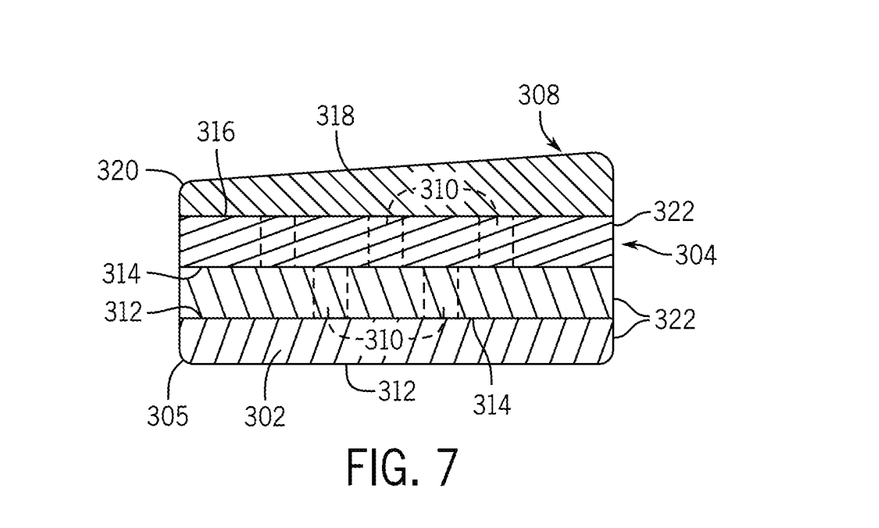
FIG. 7 is a cross-sectional view of the breast phantom of FIG. 6, in accordance with the disclosure.

Each of the bottom section 302, the textured section 304 and the target section 306 are formed with a flat bottom surface 312, a flat top surface 314, and a vertical rear surface 322, such that the sections 302, 304, and 306 can be readily placed in an aligned, stacked configuration as shown in FIGS. 6 and 7 to form the phantom 300. The sections 302,304,306 and 308, and at least the section 308, are formed of non-compressible, e.g., rigid, materials, such that such that the phantom 300 does not change shape when compressed between the compression paddle 28 and the compression surface 50 of the mammography imaging device 12 when employed in an evaluation of the mammography imaging device 12 and the image and/or scattering correction algorithms deployed or instantiated thereon. With this aspect of the phantom 300 and the constituent sections 302,304,306 and 308, the non-uniform thickness of the phantom 300 in any of various configurations for the sections 302,304,306,308 is completely repeatable across multiple test or evaluation set-ups for effective evaluation and determination of the image quality of the mammography imaging device 12.

Figure 8A:
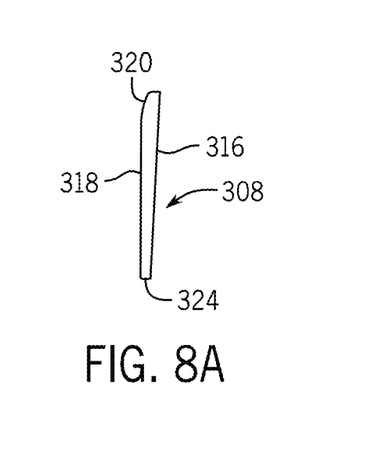
FIGS. 8A-8C are cross-sectional views of different top sections employed in the phantom of FIG. 6, in accordance with the disclosure.
Figure 8B:
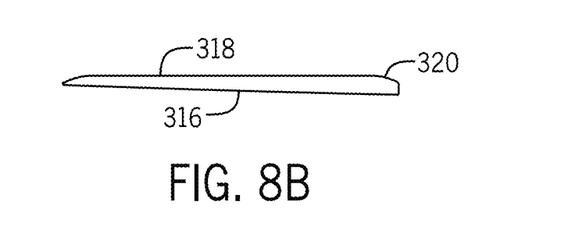
Figure 8C:
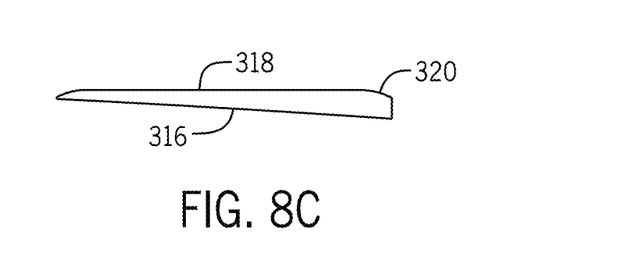

The top section 308 is also formed from a breast-equivalent tissue, but as shown in the exemplary embodiments of FIGS. 6-8, the top section 308 is formed with a flat lower surface 316, which can be aligned and/or positioned on the flat top surface 314 of any of the bottom section 302, the textured section 304 and the target section 306, depending upon the particular configuration for the phantom 300, and a flat vertical surface 324. Opposite the flat lower surface 316, the top section 308 includes a sloped upper surface 318. The sloped upper surface 318 is formed similarly to the top surface 212 of phantom 200, such that the sloped upper surface 318 provides a difference in the thickness of the top section 308 of between about 0.0 cm and about 1.0 cm across the length L or width W of the top section 308. The top section 308 also includes a curved peripheral edge 320 that approximates the actual curve on the edge of a breast simulated by the phantom 300. Additionally, the direction of the slope on the upper surface 318 can be oriented in the anterior/posterior direction, as shown in FIG. 8A, or in one of the lateral directions, i.e., left-to-right, or right-to-left, as shown in FIGS. 8B and 8C.

Figure 9:
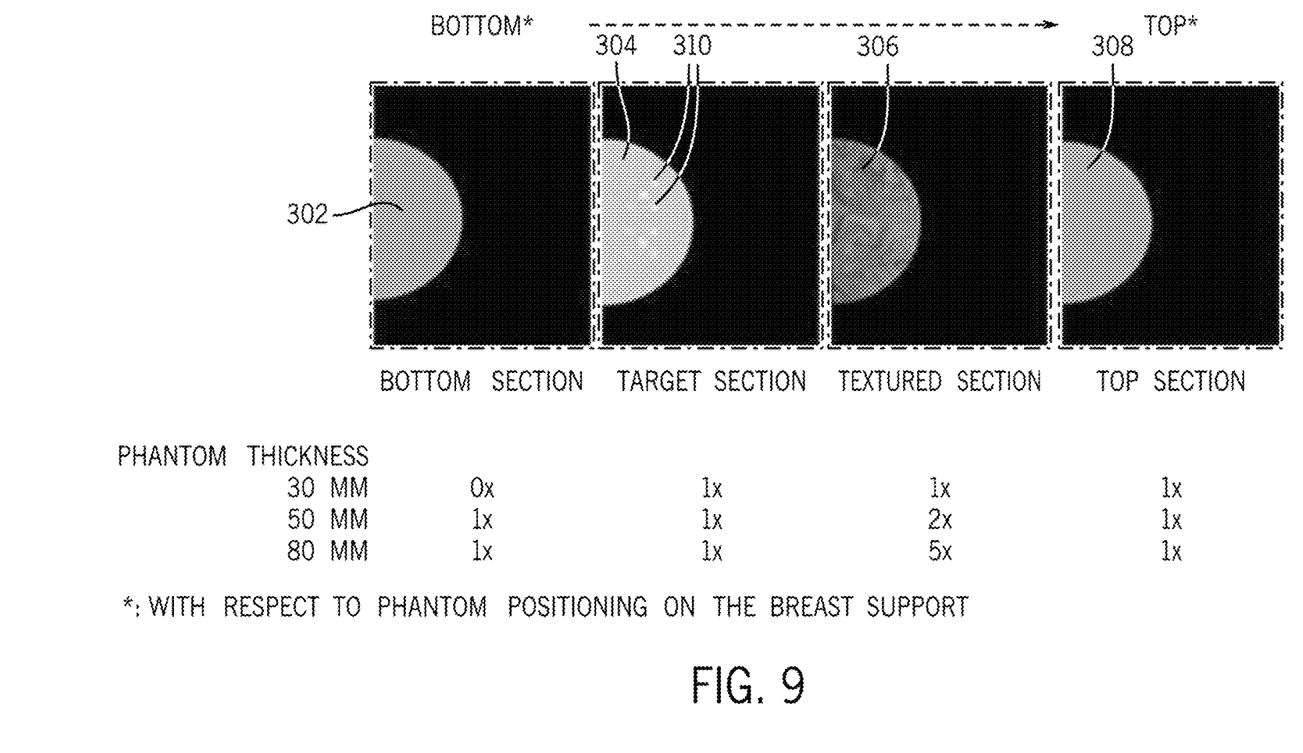
FIG. 9 is a chart of different configurations for the breast phantom of FIG. 6 having different numbers of sections and accompanying thicknesses, in accordance with the disclosure.

Looking now at FIG. 9, the phantom 300 can be formed from a number of different combinations of the sections 302,304,306 and 308 to form the phantom 300. As the target section 304 and the top section 308 including the sloped upper surface 318 are the only required components for the phantom 300, the additional layers employed to provide the phantom 300 with the desired thickness can be made up of different number of the other sections. To increase the ease of construction of the phantom 300, the sections 302,304, 306 can each be formed with uniform thickness for each type of section 302,304,306 and 308, or a uniform thickness that is the same for all sections 302,304,306, such as a thickness of 10 mm. Further, the sections 302,304,306 and 308 are not affixed to one another in the formation of the phantom 300, but can be aligned and held in alignment with one another in any suitable manner, such as by an external alignment device (not shown) that is engaged with each of the layered sections 302,304,306, 308, such as by a tab (not shown) formed on a rear vertical surface 322,324 of each of the sections 302,304,306,308 that is inserted within a complementary slot (not shown) in the external alignment device.

Still referring to the exemplary embodiments of FIG. 9, to construct an example 30 mm thick phantom 300 a single textured layer 304, a single target layer 306 and a top layer 308 and be placed in an aligned and stacked configuration. Further, to construct an example 50 mm thick phantom 300, a single bottom section 302, a single target section 304, a pair of textured sections 306 and a top section 308 can be placed in an aligned and stacked configuration. Also, for constructing an example 80 mm thick phantom 300, a single bottom section 302, a single target section 304, five (5) textured sections 306 and a top section 308 can be placed in an aligned and stacked configuration. In each of the exemplary embodiment, the thickness of the top section 308 is determined by the thickest portion of the top section 308, as defined by the high side of the sloped upper surface 318.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. A mammography phantom comprising;
   a. non-uniform thickness body formed of a breast-equivalent material, the body including a planar sloped upper surface defining an angle relative to a flat bottom surface; and
   b. a number of test plugs disposed within the body.

2. The mammography phantom of claim 1, wherein the non-uniform thickness body is formed of a breast tissue equivalent material.

3. A mammography phantom comprising;
   a. non-uniform thickness body formed of a breast-equivalent material, the body including a sloped upper surface; and
   b. a number of test plugs disposed within the body,
   wherein the non-uniform thickness body has difference in thickness across the body of between about 0.0 cm and 1.0 cm.

4. A mammography phantom comprising;
 a. non-uniform thickness body formed of a breast-equivalent material, the body including a sloped upper surface; and
 b. a number of test plugs disposed within the body, wherein body comprises a number of separable sections.

5. The mammography phantom of claim 4, wherein the number of separable sections comprises:
 a. a top section including the sloped upper surface; and
 b. a target section including a number of test plugs therein.

6. The mammography phantom of claim 5, wherein the number of sections further comprises at least one textured section.

7. The mammography phantom of claim 5, wherein the number of sections further comprises bottom section.

8. The mammography phantom of claim 5, wherein the top section has a difference in thickness across the top surface of between 0.0 cm and 1.0 cm.

9. The mammography phantom of claim 1, wherein the sloped upper surface is oriented in an anterior/posterior direction.

10. The mammography phantom of claim 1, wherein the sloped upper surface is oriented in a lateral direction.

11. A top section for a breast phantom, the top section comprising a non-uniform thickness body having a planar sloped upper surface defining an angle relative to a flat bottom surface.

12. The top section of claim 11, wherein the body is formed of a non-compressible breast-equivalent material.

13. The top section of claim 11, wherein the body is formed of a rigid breast-equivalent material.

14. The top section of claim 11, wherein the sloped upper surface is oriented in an anterior/posterior direction.

15. The top section of claim 11, wherein the sloped upper surface is oriented in a lateral direction.

16. The top section of claim 11, wherein the top section has a difference in thickness across the top surface of between 0.0 cm and 1.0 cm.

17. A method for evaluating the performance of a mammography imaging device including an image correction algorithm, the method comprising the steps of:
 a. providing a mammography imaging device comprising:
  i. a gantry including a radiation source, a detector alignable with the radiation source and defining a compression surface, and a compression paddle moveably disposed on the gantry between the radiation source and the detector; and
  ii. a controller operably connected to the gantry to control the operation of the compression paddle, radiation source and detector to generate image data, the controller including a central processing unit and interconnected electronic memory unit for processing the image data from the detector to form images employing an image correction algorithm,
 b. providing a mammography phantom comprising:
  i. non-uniform thickness body formed of a breast-equivalent material, the body including a sloped upper surface; and
  ii. a number of test plugs disposed within the body; and
 c. engaging the phantom between the compression paddle and the compression surface; and
 d. obtaining image data of the phantom for evaluation of the performance of the mammography imaging device and image correction algorithm.

18. The method of claim 17, wherein the step of providing the non-uniform thickness body comprises:
 a. providing a top section comprising a non-uniform thickness body having a sloped upper surface;
 b. providing a target section including a number of test plugs therein; and
 c. assembling the top section and the target section to form the phantom.

19. The method of claim 17, wherein the non-uniform thickness body has a difference in thickness across the body of between 0.0 cm and 1.0 cm.

20. The method of claim 17, wherein the sloped upper surface is oriented in one of an anterior/posterior direction or a lateral direction.

* * * * *